United States Patent [19]
McGuire

[11] Patent Number: 5,381,077
[45] Date of Patent: Jan. 10, 1995

[54] POWER CONTROL CIRCUIT FOR HIGH INTENSITY DISCHARGE LAMPS

[76] Inventor: Thomas B. McGuire, 3449 Mt. Aachen Ave., San Diego, Calif. 92111

[21] Appl. No.: 169,364
[22] Filed: Dec. 20, 1993
[51] Int. Cl.⁶ ............................................. H05B 41/16
[52] U.S. Cl. .................... 315/247; 315/209 R; 315/291; 315/307; 315/DIG. 4; 315/DIG. 7
[58] Field of Search .......... 315/246, 247, 248, 209 R, 315/291, 307, 308, 224, DIG. 4, DIG. 7

[56] References Cited
U.S. PATENT DOCUMENTS

| | | |
|---|---|---|
| 4,170,747 | 10/1979 | Holmes ...................... 315/DIG. 7 X |
| 4,373,146 | 2/1983 | Bonazoli et al. .......... 315/DIG. 7 X |
| 4,751,398 | 6/1988 | Ertz, III ................................ 307/66 |
| 4,928,038 | 5/1990 | Nerone ............................. 315/209 R |

Primary Examiner—Robert J. Pascal
Assistant Examiner—Haissa Philogene
Attorney, Agent, or Firm—Henri J. A. Charmasson; John D. Buchaca

[57] ABSTRACT

A versatile electrical circuit for controlling the operation of a variety of high intensity discharge, high and low pressure sodium, mercury vapor, metal halide, or xenon arc lamps uses a pulse-width-modulator to regulate the alternating or direct current drawn through the lamp from a regulated power source in accordance with the lamp power rating and the desired light intensity setting and in response to the current sensed through the lamp, and may be powered by an AC or DC power source. The circuit uses a H-bridge to apply an alternating voltage to the lamp that does not include any transformer.

13 Claims, 3 Drawing Sheets

POWER CONTROL CIRCUIT FOR HIGH INTENSITY DISCHARGE LAMPS

FIELD OF THE INVENTION

This invention relates to electrical circuits used to energize and control High Intensity Discharge (HID) lamps, High Pressure Sodium and Low Pressure Sodium lamps, Mercury Vapor lamps, Metal Halide lamps, and Xenon Arc lamps, and other types of high intensity lighting elements which must be energized by a power source capable of limiting and properly controlling the current flowing through the lamp during its warm-up periods and continuous burning mode.

BACKGROUND OF THE INVENTION

Current types of high intensity lamps must be powered by a AC power source. New types operable by DC power source have been developed. The power supplies and ballasts of the prior art are each specifically designed to energize and control a single type of high intensity lighting element, and offers little or no control of the light intensity of the lamp. This is due to the fact that those devices employ ferro-resonant transformers which are designed to operate at a single frequency and can only deliver the specific voltage and current required by a particular lamp model. Since the light intensity of the lamp depends upon the lamp voltage rating and the current running through it, the power source of the prior art can not provide a convenient brightness control.

The state of the art is best illustrated in the disclosure of U.S. Pat. No. 4,751,398 Ertz, III which uses an output transformer operating at a high frequency.

SUMMARY OF THE INVENTION

The principal and secondary objects of this invention are to provide a more versatile type of electrical circuit for powering high intensity lamps which can accomodate a wide variety of types of lamps and power ratings, avoid the bulkiness, weight, and costs of ferro-resonant transformers and other magnetic coupling components, provide greater electrical efficiency than magnetic ballast devices, offer a wide range of light intensity control, and can be operated from either AC or DC power sources.

These and other objects are achieved by a circuit which operates from a regulated DC power source and regulates the current flowing through the lamp by means of a serial switch driven by a pulse modulated signal responsive to a current monitoring feedback signal, a wattage selection switch and to an external dimmer switch. If necessary to power the currently available HID lamps, a direct current H-type bridge acts as an inverter to alternate the current through the lamp without using an output transformer. The pulse-width modulator comprises a circuit that compares the current rising through the lamp to an adjustable threshold. When the threshold is exceeded a flip/flop driving the current control switches is reset. The flip/flop is clocked at a high frequency above the audible range.

DESCRIPTION OF THE PREFERRED EMBODIMENT OF THE INVENTION

Figure 1:
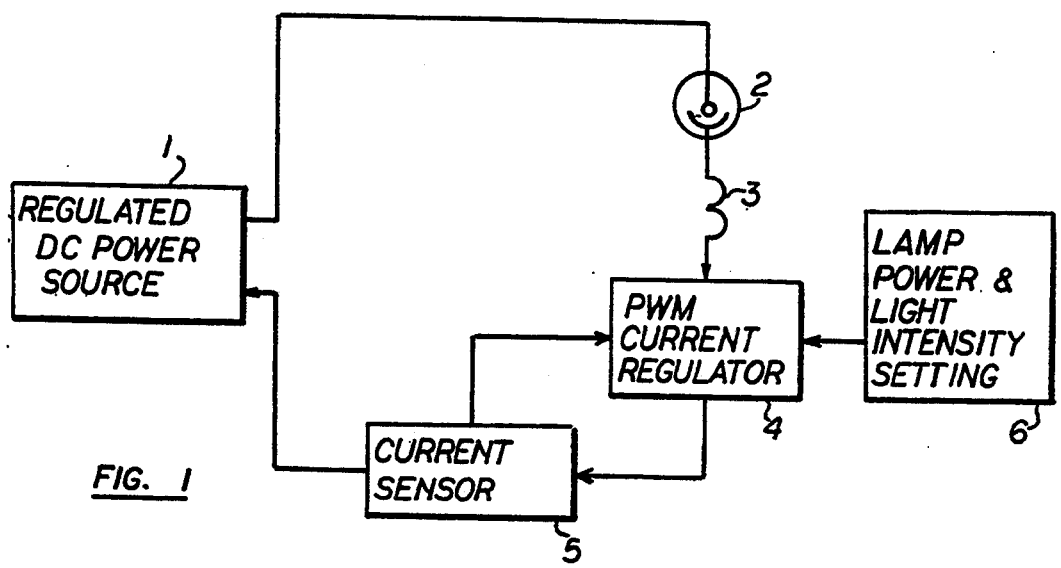
FIG. 1 is a block diagram illustrating the basic components of the various disclosed embodiments of the invention.

The basic components of the various devices disclosed below which embody the invention are illustrated in FIG. 1, and comprise a voltage-regulated DC power source which is applied to a lighting element 2 mounted in series with a ballast induction coil 3, and a pulse-width-modulation current regulator 4 responsive to a current sensor 5 and a programmable lamp power and light intensity setting 6. The lighting element may be one of a variety of high intensity arc, discharge or vapor lamps.

Figure 2:
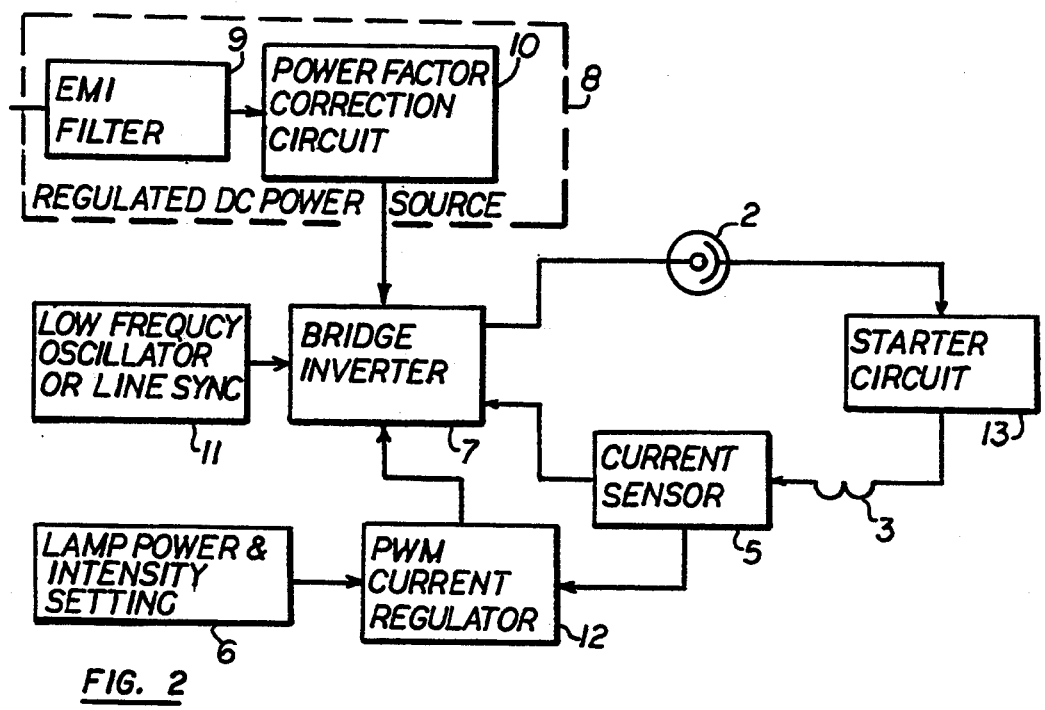
FIG. 2 is a block diagram illustrating the components of the embodiments capable of providing an alternating current to the lamps.

In the preferred embodiment of the invention illustrated in FIG. 2, the lighting element 2 is energized by an alternating current generated by a bridge inverter 7 supplied by a DC power source. The power source comprises an EMI filter 9 and a power factor correcting rectifier circuit 10. The bridge 7 is driven by a signal running at a frequency close to the lower part of the audible range which can be derived from the power line or generated by a low frequency oscillator 11. The current regulation is accomplished by modulating the bridge inverter 7 by a signal derived from a pulse-width generator 12 responsive to signals received from the current sensor 5 lamp power and light intensity setting circuit 6. A starting circuit 13 is placed in series with the lighting element 1 and the induction coil 3.

It is noteworthy that even in the case where the lighting element 2 is energized by an alternating current source, no transformer or other magnetic-coupling component is used in the energizing circuit.

Figure 3:
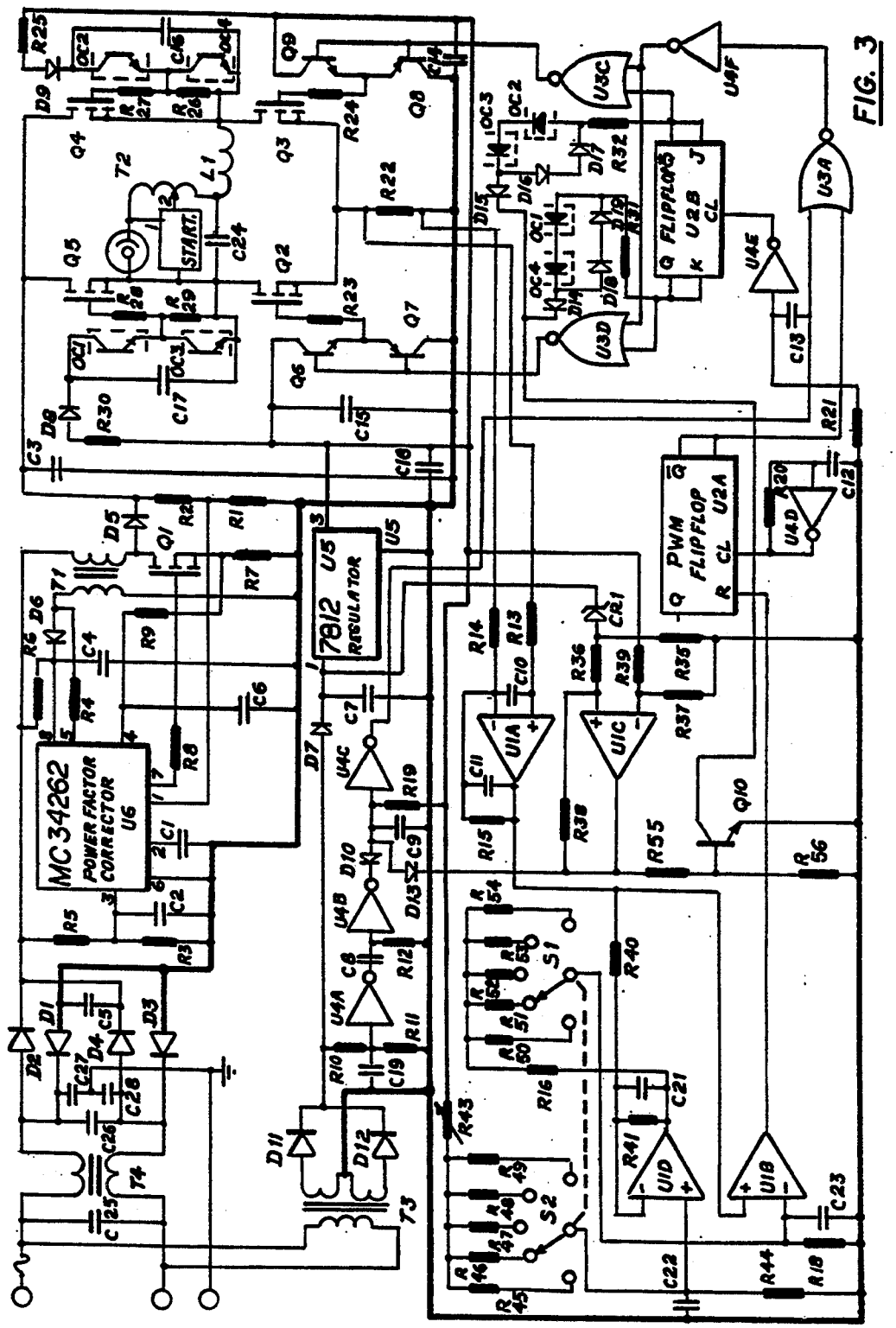
FIG. 3 is a schematic of an embodiment according to the block diagram of FIG. 2.

The complete circuit is illustrated in the schematic of FIG. 3. The H-bridge employs 4 NFET switches Q2, Q3, Q4 and Q5.

In order to avoid objectionable audible noise, the inverter is operated at two different frequencies. The upper section of the bridge, NFETs Q4 and Q5, are operated near the low end of the audible frequency spectrum and do not have high speed switching requirements. They are switched at the input power line frequency (50/60 HZ), and switching takes place when current through the bridge is near zero. Since current is low at the time of switching, driving signals for the upper NFETs can be relatively slow without wasting power. This is easily accomplished by the use of four optoisolators. OC1 through OC4, which provide high voltage isolation from the rest of the control circuit.

Diodes D8 and D9 and current limiting resistors R25 and R30 charge capacitors C17 and C16 to 12 volts whenever the lower section of the bridge is switched on. The charge on these capacitors drains off very slowly because the only current they are required to supply is the NFET gate switching current and the current drawn by resistors R26 and R29 which have a very high resistance value. The switching current is very low because switching occurs at a low frequency and is completed in a little over one micro second.

Switching in the lower section of the bridge, NFET's Q2 and Q3, also takes place at the same low frequency as in the upper section (both upper and lower sections are controlled by the J-K flip/flop U2B) but, in the lower section the "on" side is pulsed on and off at a high frequency rate for control of the lamp current. A pulse width modulation (PWM) signal originates at J-K flip/flop U2A.

An oscillator comprised of Schmidt trigger amplifier U4D and capacitor C12 clocks the PWM flip/flop U2A at a frequency rate above the range of human hearing, typically 25 KHZ. The output of the flip/flop is used to open either Q2 or Q3, depending on the state of flip/flop U2B.

Assuming optoisolators OC1 and OC4 are on, and OC2 and OC3 are off, Q5 will then be on and Q4 will be off. When the PWM flip/flop U2A is turned on by the oscillator, current will flow in the bridge through Q5, the HID lamp, ignitor transformer T2, ballast inductor L1, Q3 and through R22 to circuit ground.

The lamp and the ignitor transformer T2, present a low impedance and current ramps up at a rate controlled by inductor L1. As current, shaped by the induction L1, builds through the circuit, the current sense resistor R22 presents a positive voltage ramping up at the positive input terminal of amplifier U1A. U1A amplifies this voltage and delivers it to the positive input terminal of U1B. When the voltage at the positive input of U1B exceeds the voltage at the negative input, the output goes high and resets the PWM flip/flop U2A causing current to cease. The peak amplitude of current through the H-bridge and the lamp are thereby limited to a maximum value each time the oscillator turns on flip/flop U2A.

Amplifier U1A is a fast responding amplifier which increases the very small sense voltage across R22 to a more usable level without appreciably changing the ramp waveshape. Capacitors C10 and C11 are small values which prevent the amplification of high frequency noise.

Amplifier U1D is a very slow responding amplifier with higher gain. The ramp pulses at output of U1A are integrated and inverted and appear as a voltage level at the output of amplifier U1D. This voltage level is the inverse measure of the average current through the lamp. This voltage level goes lower as the average current through the lamp increases. As the average current through the bridge and lamp increases, the peak current required to reset the PWM flip/flop decreases because the voltage at the negative input terminal of U1B becomes lower.

This feedback control circuit provides the proper environment for an HID lamp through its warmup phase as follows. When a cold lamp is ignited, the voltage across the lamp is about 20% of its normal operating voltage. The DC voltage across capacitor C3 and the H-bridge is constant because it is controlled by a feedback loop in the Power Factor Correction Rectifier Circuit.

During warmup when voltage across the lamp is low, the voltage across L1 is large and current builds up rapidly until it is terminated by reset of the PWM flip/flop. Peak current is limited only by the setting of switch S1 and R16 because at this time, the average current through the bridge is low and amplifier U1D is saturated with its output near the positive supply voltage. As the lamp warms up, voltage across it increases reducing the voltage across L1 and increasing the time required for the current to build up. The peak amplitude of the current ramp remains the same but the time to ramp up is increasing; therefore, the average current is increasing. When average current reaches the level set by control S2 and R43, amplifier U1D comes out of saturation and takes over control. The voltage at its output begins to fall and thereby reduces the peak current required to reset the PWM flip/flop.

Switch S1 is set to limit cold and warmup current to a value allowed by the lamp specifications. This control takes the form of a switched divider network which has as many switch positions as are required to match the lamps types to be served by the ballast.

Switch S2 sets the average current to be supplied to the lamp after warmup. Average current through the lamp is proportional to the power rating of the lamp because it is also the average current through the bridge and the voltage across the bridge is fixed. Power into the bridge is therefore proportional to the current through it. This control also takes the form of a switched divider network mechanically linked to switch S1. Switch positions can therefore each correspond to the power rating of the various lamps, within the power rating of the ballast, that are to be used with it.

Dimming or light intensity control is accomplished by reducing the voltage applied to the divider network of S2 through potentiometer R43 or an equivalent circuit thereby reducing current through the lamp after warmup. Many well-known means are available to accomplish this control remotely and with voltage isolation from the lamp power circuits.

The circuit operates from an AC power line. In this configuration T3, a small control transformer provides the power for the control circuit by supplying unregulated DC voltage to the input of voltage regulator U5. In this embodiment, rectified but unfiltered DC is applied to the input of U4A and results in a square wave of twice the input AC line frequency at the output of U4A. This square wave is differentiated and referenced to circuit ground by C8 and R12 resulting in narrow negative pulses at the output of U4B. Each pulse discharges C9 which is recharged by R19 resulting in positive pulses at the output of U4C which are about 1 millisecond in width. These pulses pass through nor gate U3A and inverting schmidt trigger U4F and appear at inputs to nor gates U3C and U3D causing their outputs to go low turning off both Q2 and Q3. Any current flowing in L1 at this time will be diverted from Q2 or Q3 to the drain to source diode of the NFET directly above it. C13 and R21 have a time constant such that time is allowed for this current to decay before the positive going wave front at the output of U4E causes the inverter flip/flop U2B to toggle.

Operational amplifier U1C functions as a comparator to control circuit startup and shutdown when the input power comes into, and out of, a safe operating range of voltage. In this embodiment the DC voltage is monitored at the input to the 12 volt regulator U5. When input voltage is too low for proper operations. CR1 is not conducting, the negative input of U1C is more positive than its positive input therefore the output remains low. While the output of U1C is low, it holds down the input of U4C through diode D13 causing its output to be high which shuts off power to the lower section of the bridge Q2 and Q3. A low at the output of U1C also causes transistor Q10 to be nonconducting so that the upper section of the bridge is also held off because there is no conduction path for the LEDS of the optoisolators and R29 and R26 therefore assure that Q4 and Q5 are held off. When the voltage at the input to voltage regulator U5 is high enough to become more positive than the negative input of U1C, the output of the latter becomes high. Resistor R38 provides hysteresis for the on-off control.

The lamp ignitor circuit is made up of transformer T2 and a conventional high pressure sodium ignitor type circuit (ST1). Transformer T2 is designed such that it will provide the high impedance and step-up ratio necessary to develop starting voltage and it will then, through core saturation, become a low impedance capable of carrying full lamp current after the lamp has been lighted. This transformer design eliminates the need for an electromechanical device of questionable reliability to switch the starter circuit out of the high current path of the lamp current after ignition.

Figure 4:
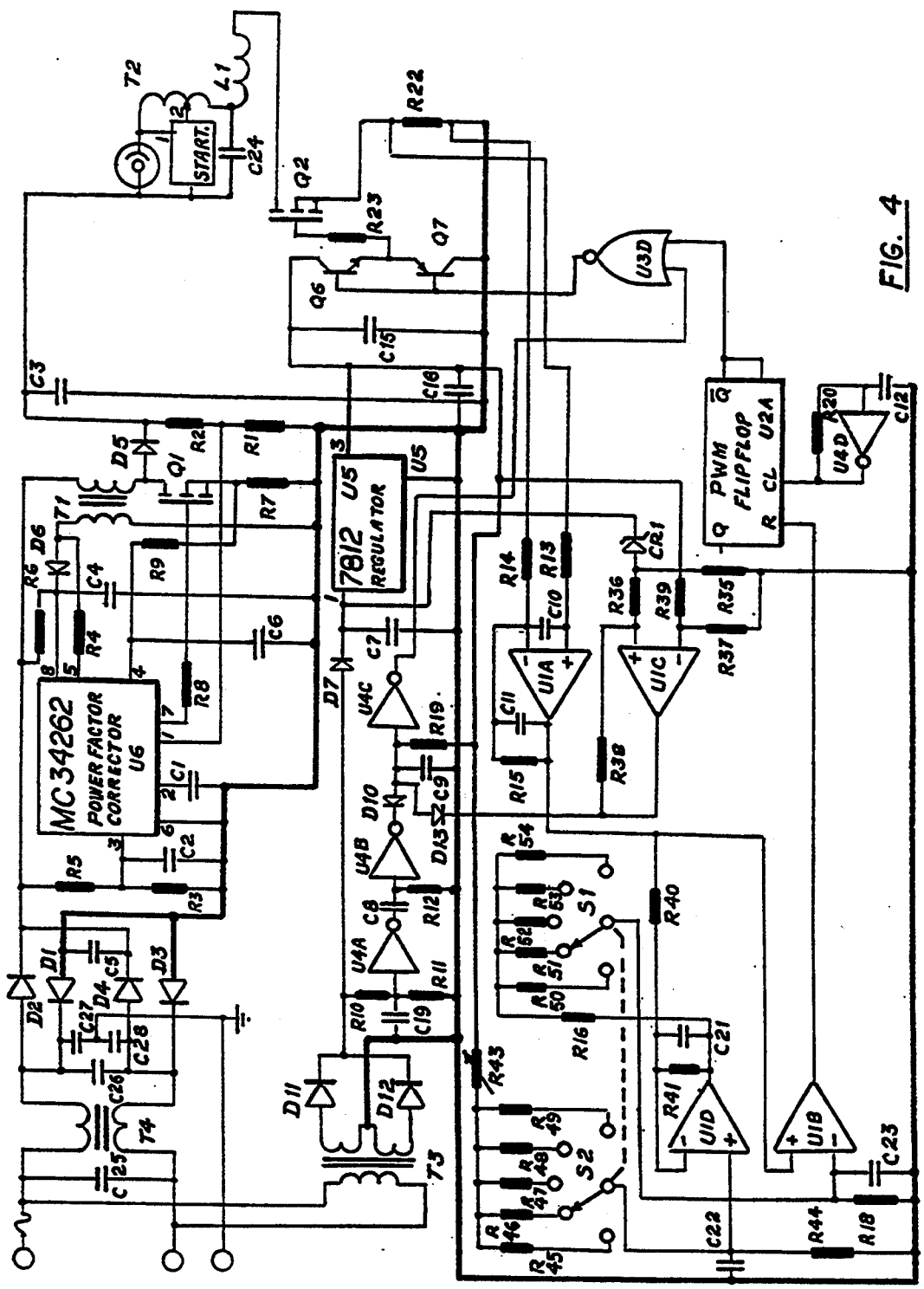
FIG. 4 is the schematic of an embodiment for powering a DC-powered lamp.

FIG. 4 shows another embodiment of the invention in a simplified form that could be employed if HID lamps become available that are designed to operate on DC power.

The embodiments disclosed in the schematics of FIGS. 3 and 4 can be easily modified to operate from a DC power source by eliminating the auxiliary transformer T3, turning the Schmidt trigger U4A into a low frequency oscillator and driving the DC supply for the circuit from the voltage available on the cathodes of rectifiers D2 and D4.

While the preferred embodiments of the invention have been described, modifications can be made and other embodiments may be devised without departing from the spirit of the invention and the scope of the appended claims.

What is claimed is:

1. A circuit for controlling the operation of a lighting element, which comprises:
   an induction coil mounted in series with said element;
   means for pulsing and applying a voltage-regulated DC power source across said element and coil without using any magnetic coupling device, wherein said means for pulsing and applying comprise means for alternately reversing the current flowing through said element including an H-bridge that does not have any magnetic coupling component;
   means for sensing a current flowing through said element;
   means for setting the light intensity of said element;
   pulse-modulation means, responsive to said means for sensing and setting, for regulating the current flowing through said element; and
   wherein said H-bridge comprises:
      a first switch between a first pole of said power source and a first terminal of said element, a second opposite terminal of said element being connected to a first terminal of said induction coil;
      a second switch between said first pole and a second terminal of said induction coil;
      a third switch between the first terminal of said element and a first terminal of said means for sensing, a second terminal of said means for sensing being connected to a second pole of said power source;
      a fourth switch between said second terminal of said induction coil and the first terminal of said means for sensing;
      a first toggling component for alternately opening said first and second switches; and
      means for opening said third and fourth switches in response to said pulse-modulation means.

2. The circuit of claim 1 wherein said pulse-modulation means comprise:
   a second toggling component controlling said third and fourth switches;
   a pulse source clocking said second toggling component; and
   timing means for resetting said second toggling component as a function of the current sensed by said means for sensing.

3. The circuit of claim 2 wherein said timing means comprises a ramp voltage generator fed by a signal from said means for sensing; and
   an adjustable-threshold component for comparing the output of said ramp-voltage generator to a reference voltage.

4. The circuit of claim 3 wherein said means for setting the light intensity comprises means for adjusting a threshold of said adjustable-threshold component.

5. The circuit of claim 4 wherein said ramp-voltage generator comprises said inductive coil.

6. The circuit of 1 claim which further comprises means for setting the power usable by said element.

7. The circuit of claim 6, wherein said means for setting the power comprise additional means for controling said adjustable threshold component.

8. The circuit of claim 4 which further comprises means for setting the power usable by said element.

9. The circuit of claim 8, wherein said means for setting the power comprise additional means for controling said adjustable threshold component.

10. A circuit for controlling the operation of a lighting element, which comprises:
    an induction coil mounted in series with said element;
    means for pulsing and applying a voltage-regulated DC power source across said element and coil without using any magnetic coupling device;
    means for sensing a current flowing through said elements.
    means for setting the light intensity of said element;
    pulse-modulation means, responsive to said means for sensing and setting, for regulating the current flowing through said element; and
    wherein said pulse modulation means for regulating comprise:
       first means for controlling said current during a warm-up period of said element; and
       second means for controlling said current after said warm-up period.

11. The circuit of claim 10, wherein said second means for controlling said current comprise switch means for setting a power rating of said element.

12. A circuit for controlling the operation of a lighting element, which comprises:
    an induction coil mounted in series with said element;
    means for pulsing and applying a voltage-regulated DC power source across said element and coil without using any magnetic coupling device;
    means for sensing a current flowing through said element;
    pulse-modulation means, responsive to said means for sensing and setting, for regulating the current flowing through said element, said pulse-modulation means comprising:
       an adjustable current switch mounted in series with said element;
       a toggling component controlling said switch;

a pulse source clocking said toggling component; and timing means for resetting said toggling component as a function of the current sensed by said means for sensing, said timing means comprising a ramp voltage generator fed by a signal from said means for sensing; and an adjustable-threshold component for comparing the output of said ramp-voltage generator to a reference voltage, wherein said ramp-voltage generator comprises said inductive coil;

means for setting the light intensity of said element comprising means for adjusting a threshold of said adjustable-threshold component;

means for setting a power rating of said element;

first means, responsive to said means for setting said power rating for controlling said current after a warm-up period of said element; and second means for controlling said current during said warm-up period.

13. A circuit for controlling the operation of a lighting element, which comprises:

an induction coil mounted in series with said element;

means for pulsing and applying a voltage-regulated DC power source across said element and coil;

means for sensing a current flowing through said element;

means for setting the light intensity of said element; and pulse-modulation means, responsive to said means for sensing and setting, for regulating the current flowing through said element, said pulse-modulation means comprising:

an adjustable current switch mounted in series with said element;

a toggling component controlling said switch;

a pulse source clocking said toggling component; and timing means for resetting said toggling component as a function of the current sensed by said means for sensing; and wherein said circuit further comprises:

means for setting a power rating of said element;

first means, responsive to said means for setting said power rating for controlling said current after a warm-up period of said element; and second means for controlling said current during said warm-up period.

* * * * *